US012169859B1

(12) United States Patent
Lorbert et al.

(10) Patent No.: US 12,169,859 B1
(45) Date of Patent: Dec. 17, 2024

(54) REAL-TIME INTERACTIVE OUTFIT RECOMMENDATION

(71) Applicant: Amazon Technologies, Inc., Seattle, WA (US)

(72) Inventors: Alexander Lorbert, Givat Shmuel (IL); David Neiman, Tel-Aviv (IL); Arik Poznanski, Herzliya (IL); Eduard Oks, Redmond, WA (US); Megan E Anderson, Seattle, WA (US); Layne Skullerud, La Mesa, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 257 days.

(21) Appl. No.: 17/533,903

(22) Filed: Nov. 23, 2021

(51) Int. Cl.
 *G06Q 30/00* (2023.01)
 *G06F 16/9535* (2019.01)
 *G06Q 30/0601* (2023.01)

(52) U.S. Cl.
 CPC ..... *G06Q 30/0631* (2013.01); *G06F 16/9535* (2019.01); *G06Q 30/0627* (2013.01); *G06Q 30/0643* (2013.01)

(58) Field of Classification Search
 CPC .......... G06Q 30/0631; G06Q 30/0627; G06Q 30/0643; G06F 16/9535
 See application file for complete search history.

(56) References Cited

U.S. PATENT DOCUMENTS 10,614,342 B1 * 4/2020 Lorbert ................ G06V 10/764
2021/0342917 A1 * 11/2021 Parker ................ G06Q 30/0631

OTHER PUBLICATIONS

S. C. Hidayati, C.-W. You, W.-H. Cheng and K.-L. Hua, "Learning and Recognition of Clothing Genres From Full-Body Images," in IEEE Transactions on Cybernetics, vol. 48, No. 5, pp. 1647-1659, May 2018, doi: 10.1109/TCYB.2017.2712634. (Year: 2018).*

* cited by examiner

*Primary Examiner* — Anand Loharikar
(74) *Attorney, Agent, or Firm* — K&L Gates LLP

(57) ABSTRACT

Techniques are generally described for displaying outfit recommendations using a recurrent neural network. In various examples, a computing device may receive a first state vector representing an outfit comprising at least one fashion item. First image data depicting a second fashion item of a first item category may be received. A recurrent neural network may generate a first output feature vector based on the first state vector, the first image data, a first attribute vector, and the first item category. The first output feature vector may be compared to other feature vectors representing other fashion items in the first category to determine distances between the first output feature vector and the other feature vectors. A set of fashion items may be recommended and displayed based on the distances between the first output feature vector and the other feature vectors.

20 Claims, 11 Drawing Sheets

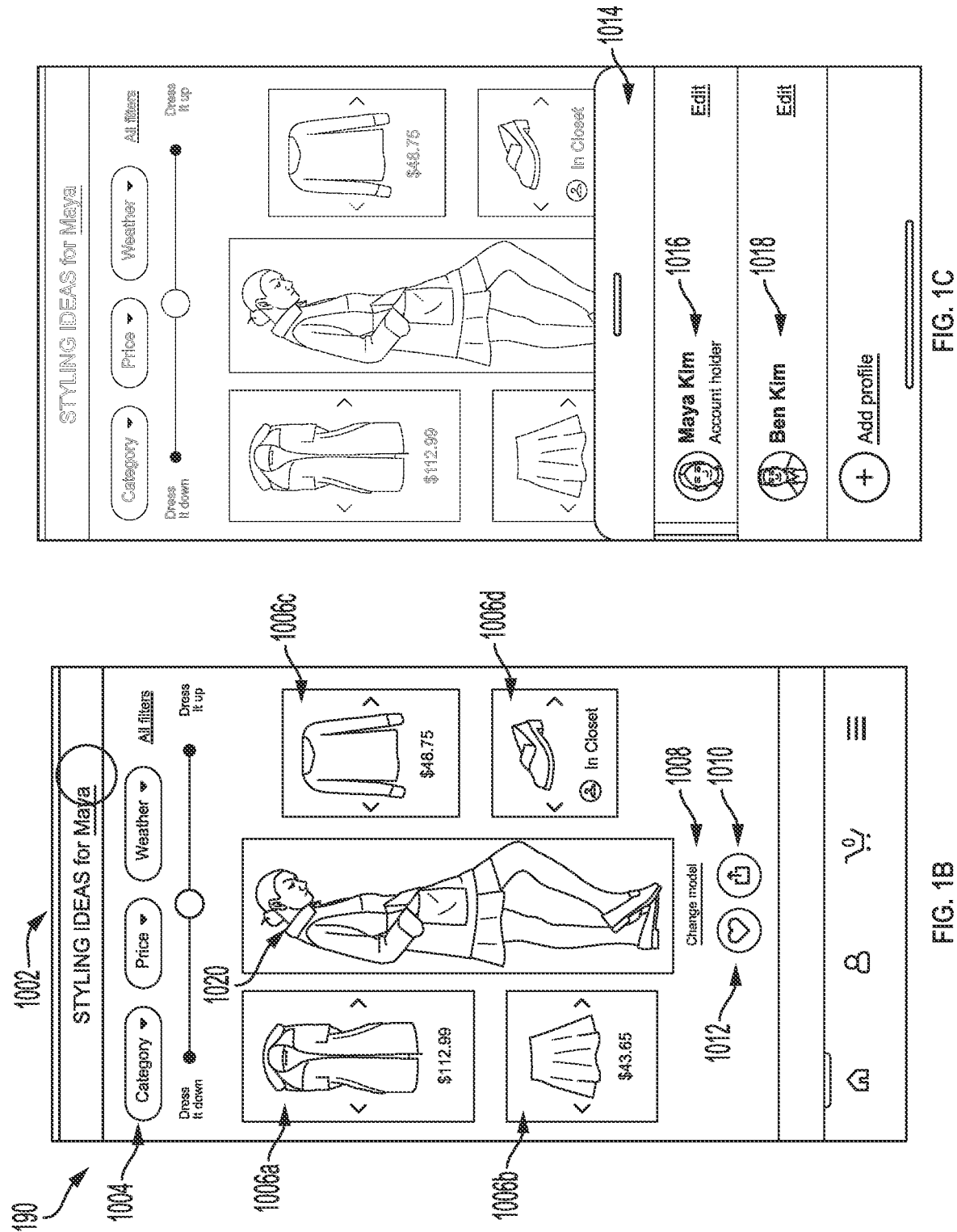

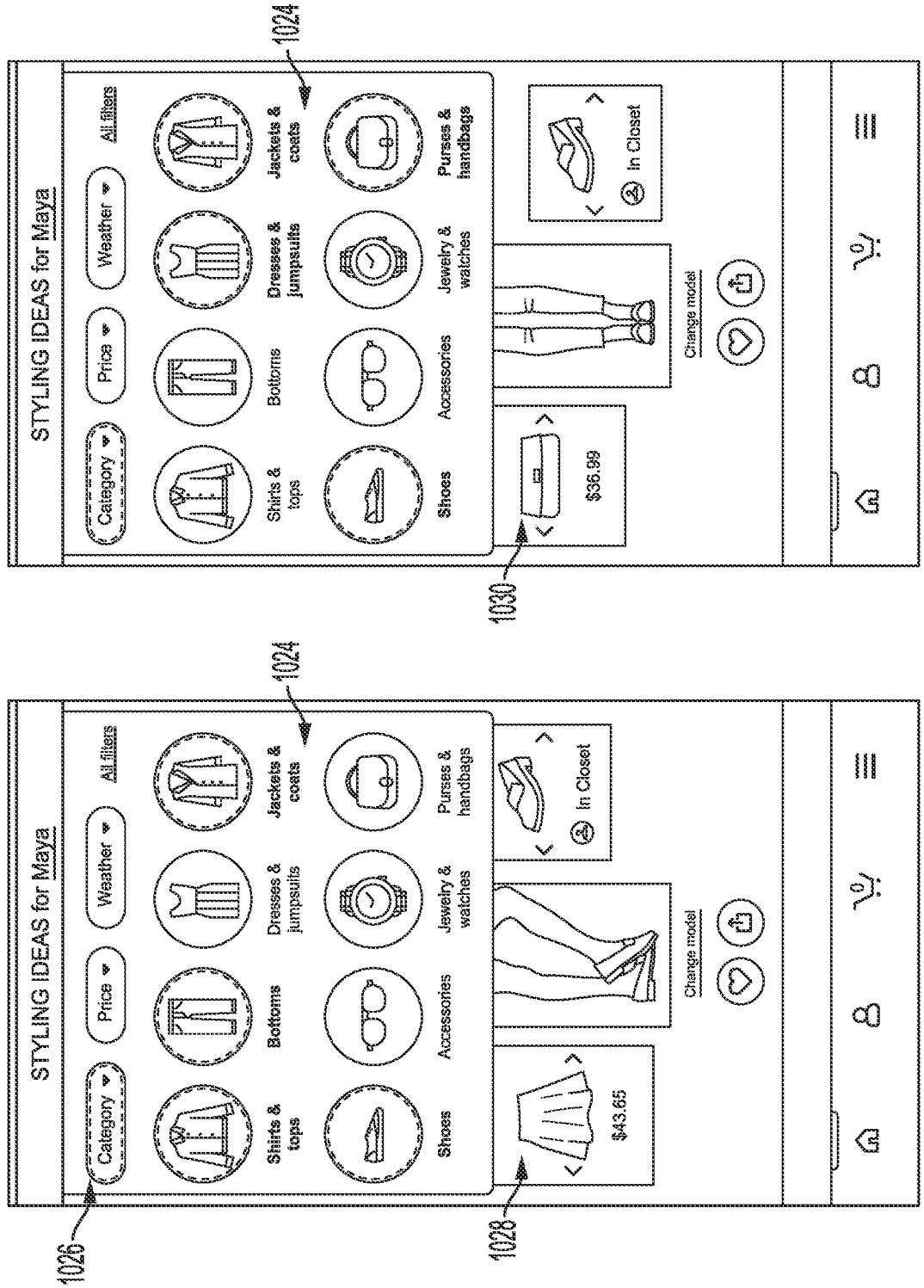

REAL-TIME INTERACTIVE OUTFIT RECOMMENDATION

BACKGROUND

Assembling different fashion items into outfits that have a pleasing visual appearance is the subject of countless fashion magazines, blogs and social commentary. Additionally, systems have been proposed for matching a fashion item with another complementary fashion item based upon similarities in the fashion items and/or prior pairings of the two fashion items together. For example, websites may recommend fashion items based on other similar items that a user has searched for, viewed and/or purchased in the past.

BRIEF DESCRIPTION OF DRAWINGS

FIGS. 1B-1I depict various graphical user interfaces that may be used to provide real-time interactive outfit recommendation, in accordance with various embodiments described herein.

DETAILED DESCRIPTION

Figure 1A:
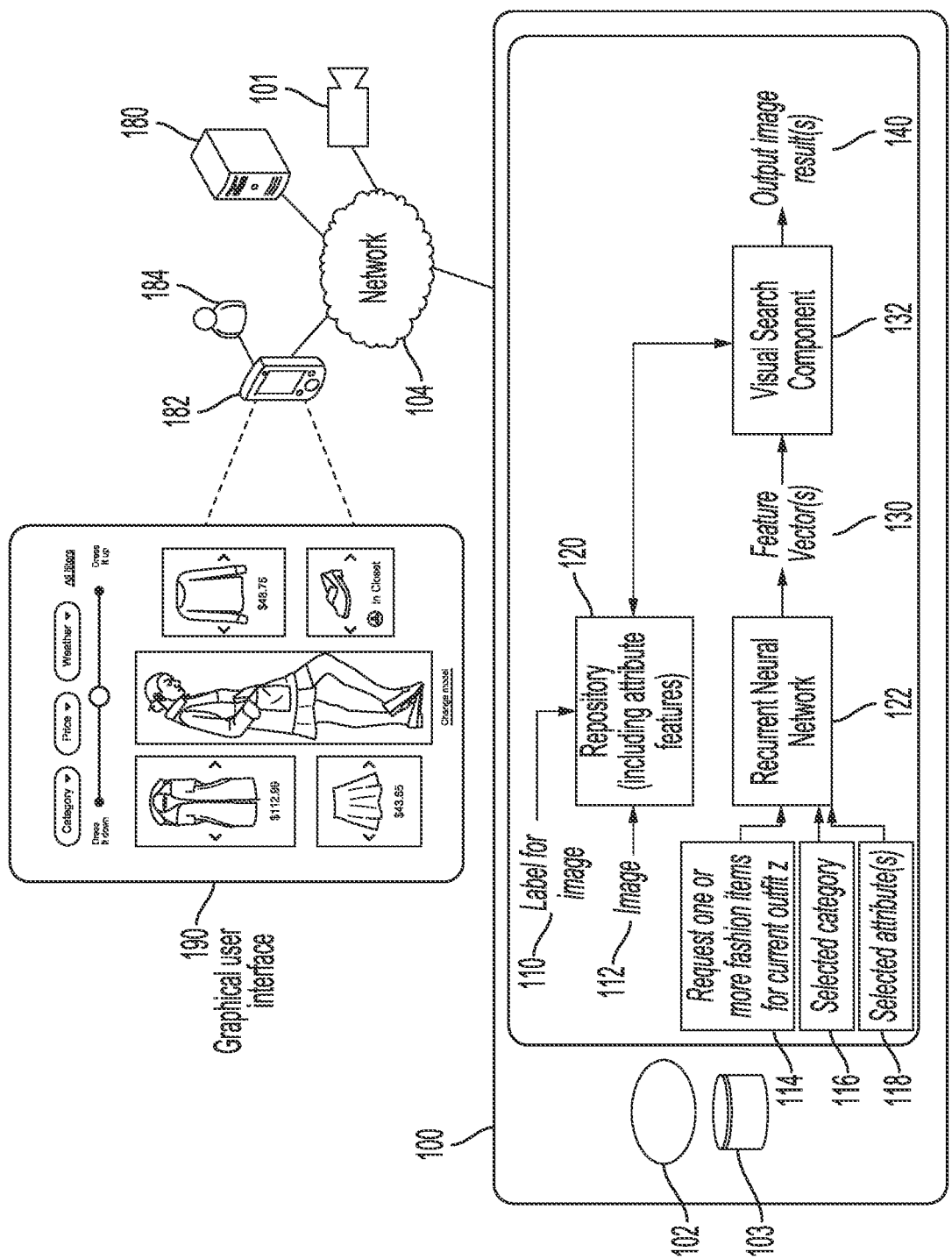
FIG. 1A depicts a system effective to perform attribute-aware outfit recommendation, in accordance with various embodiments of the present disclosure.
Figure 1E:
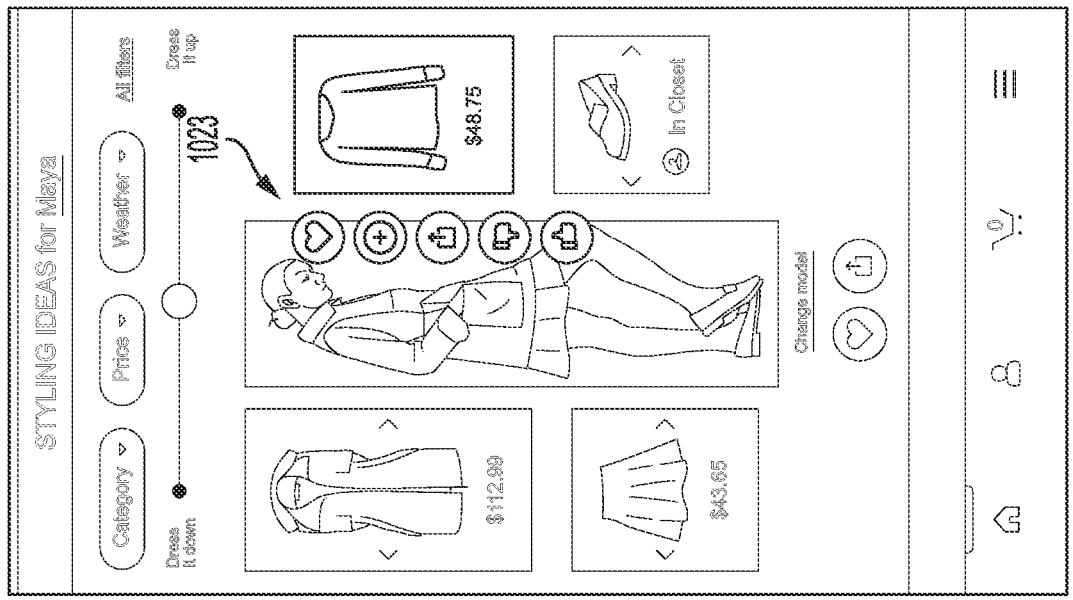

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In typical situations, people manually select fashion items that are visually appealing when grouped together into an outfit. For example, a person may select a shirt that matches a particular pair of pants owned by the person. The shirt may be selected from the person's wardrobe, from a store, from an image, and/or from an online source (e.g., an e-commerce site). Additionally, in some examples, computer-implemented algorithms have been used to match particular items of clothing. In accordance with embodiments described herein, a user may select one or more fashion items as a starting point and may request that an outfit recommendation system recommend fashion items in a particular category. Users may add fashion items that the users currently-own or fashion items that the users like or wish to buy and may use the outfit recommendation system to recommend visually-complementary items of desired categories, in real time. Presented with outfit recommendations generated using the various systems and techniques described herein, the user may select an item among the recommendations that appeals to them and may add the item to the current outfit. This process may continue until the outfit is complete. At this point, using various systems and techniques described herein, the user may save the outfit to a user profile, shop the outfit (using, for example, an e-commerce service selling the various fashion items), share the outfit (e.g., via short message service (SMS), social media, etc.), and/or perform various other actions described herein.

In various examples described herein, a particular user profile may be associated with a set of user-defined filter settings for the outfit recommendation system. For example, a user may filter outfit recommendations based on item category (e.g., the desired category/categories for recommendation), price, attributes (e.g., color, fabric, etc.), weather, season, a level of formality (e.g., formal dress, business dress, business casual dress, athletic attire, casual dress, etc.), etc. In at least some examples, the filter settings may be used to filter out fashion items that do not conform to the specified filter settings. The various filter settings (e.g., data representing user filter selections) may be saved to the user's profile and different user profiles may have different filter settings. In some examples, if the user has not selected a particular set of filter settings, a default set of filter settings may be used. In some examples, geolocation data indicating a geolocation of mobile device may be used as a signal and/or as a filter for determining recommended fashion items. For example, the geolocation data may be used to determine recommendations that are aligned with regional fashion trends. Additionally, in various examples described herein, a human model or dress form (referred to herein generally as a "model") may be shown on a graphical user interface (GUI) wearing the currently displayed recommended items. As the user scrolls through recommended items, the appearance of the model may change such that the model is shown wearing the currently-displayed fashion items. The appearance of the model may be configurable and may be saved in association with the user profile. For example, the user may select a model that resembles the user by modifying a skin tone, hair style, hair color, body type, and/or otherwise customizing the appearance of the model according to the user's preference. In various examples, the user may like and/or dislike various items recommended by the outfit recommendation system. Such signals may be used by the outfit recommendation system (and/or machine learning models thereof) to inform subsequent recommendations.

In an example, a user may select an image of a shirt as a starting point and may request that the outfit recommendation system recommend a pair of pants to go with the shirt. Additionally, the user may select one or more desired attributes, price ranges, weather scenarios, seasons, etc., for pants recommendations. For example, the user may specify that the pants should be denim (e.g., specifying a fabric attribute) and that the pants should be blue in color (e.g., specifying a color attribute). It should be appreciated that this is merely an example and any number of attributes may be selected. Next, the user may request that the outfit recommendation system recommend fashion items from other item categories for the current outfit of the selected shirt and recommended pants. The outfit recommendation system may recommend a set of clothing articles having the requested attributes which are from the category selected by the user. For example, if the user requests recommendations for scarves for an outfit that currently comprises a shirt and pants, the outfit recommendation system may recommend a set of scarves (e.g., 5, 10, 20, 50, 23, etc.) that have been determined as the top matches for the particular shirt and pants. The scarves may also include the user-specified attributes (e.g., fabric, color, pattern, texture, style, etc.). Further, the outfit recommendation techniques described herein may use state information to monitor the current state of an outfit z, so that recommendations for new categories of clothing may be generated based on all previously selected items of the outfit.

An outfit may be a grouping of two or more fashion items. Image data depicting fashion items and/or outfit accessories may be stored in one or more memories. Generally, as used herein, a "fashion item" may refer to both clothing (e.g., shirts, dresses, pants, shoes) as well as clothing accessories (e.g., belts, jewelry, scarves, gloves, wearable electronics, etc.). Additionally, "fashion item" may refer to non-wearable personal items that the user may include in an outfit to complete the outfit or "look." Examples of such non-wearable fashion items may include water bottles, phone cases, and/or other personal accessories. Additionally, in some examples, other data may be stored in association with an image of a particular fashion item data stored in a memory. For example, a label describing a category of the fashion item (e.g., pants, shirt, hat, dress, sweater, jewelry etc.) may be stored in the memory in association with the image of the fashion item. Additionally, attribute vectors (or other attribute data) comprising numeric representations (e.g., encodings) of various attributes may be stored in association with images of fashion items. Additionally, in various other examples, other data may be stored in association with the image data depicting the fashion item. For example, identifying data, such as a name of an fashion item, a designer, a description, etc. may be stored in association with an image of an fashion item. In some examples described herein, a given fashion item's attributes may be determined using named entity recognition processing to process the description of the fashion item in order to determine the item's attributes.

In some examples, image data depicting fashion items may depict a fashion item owned or otherwise currently possessed by a user of the outfit recommendation system described herein. Further, the user may save items to the user's profile (e.g., to the user's virtual "closet"), so that the user can receive styling recommendations that are visually complementary to fashion items already possessed by the user. Accordingly, in such examples, the image data may be stored locally on a device owned by the user and/or remotely in a memory made available through the user's interaction with one or more cloud services. In some other examples, image data depicting fashion items may depict an fashion item available through a store and/or e-commerce website. An outfit recommendation system as described herein may access one or more repositories of image data to recommend fashion items to a user that are determined to visually compliment one or more fashion items selected by the user as an initial fashion item or items of an outfit.

FIG. 1A depicts a system 100 effective to perform outfit recommendation using a recurrent neural network 122, in accordance with various embodiments of the present disclosure. In various examples, system 100 may comprise an electronic device including one or more processing elements 102 and non-transitory computer-readable memory 103. In some further examples, system 100 may comprise a camera 101. In other examples, system 100 may be configured in communication with a camera 101 over a network 104. Similarly, system 100 may be configured in communication with remote computing device(s) 180 and/or mobile device(s) 182 over network 104. In various examples, mobile device 182 may be associated with a user 184. In some further examples, mobile device 182 may execute a companion application of system 100. In at least some examples, the companion application may interface with, control operation of, and/or perform some or all of the functionality described below in reference to system 100. The companion application (and/or a website and/or web service) on mobile device 182 may include a GUI 190 that may provide the various functionality and/or tools described in further detail below.

Camera 101 may include, for example, a digital camera module. The digital camera module may comprise any suitable type of image sensor device or devices, such as a charge coupled device (CCD) and/or a complementary metal-oxide semiconductor (CMOS) sensor effective to capture image data of clothing articles and/or other objects. In various examples, camera 101 and/or system 100 may be effective to segment portions of image data representing fashion items from other portions of the image data in order to separate the fashion item image data from background image data, hanger image data, and/or user image data. Image data representing fashion items may be stored in a repository of fashion items, as described in further detail below.

Network 104 may be, for example, the internet, an intranet, a wide area network, a local area network, or the like. In some examples, system 100 may be effective to send and receive data over network 104. The one or more processing elements 102 of system 100 may be effective to execute one or more instructions stored in non-transitory computer-readable memory 103 to program the one or more processing elements 102 to execute the various techniques described herein.

System 100 comprises a repository 120 of image data. Repository 120 may be represented as a repository $R=\{(I_j, c_j)\}_{j=1}^{N}$ of N image-category pairs. The repository 120 may include image-category pairs included an image 112 and an associated category label (e.g., category data describing a category) for the image 110. The j-th item in the repository is associated with image $I_j$ and label $c_j \in \{1, 2, \ldots, K\}$ (labels are sometimes referred to herein as "categories"), where K is the number of different clothing article/accessory categories. Each image 112 (e.g., image $I_j$) of repository 120 is associated with a label for the image (e.g., category label $c_j$). In various examples, repository 120 may be stored in memory 103 and/or may be stored in a memory associated with remote computing device(s) 180.

A user, such as user 184, may request one or more fashion items for a current outfit z at action 114. Users may also manually add and/or delete fashion items from a current outfit z to generate an outfit z' and may request updated recommendations for the outfit z'. Requesting recommendation of one or more fashion items may comprise specification of current fashion items of the outfit z along with a selection of a next category $c_z^{t+1}$ (e.g., selected category 116). In addition, the user 184 may select one or more attributes (e.g., selected attributes 118 such as selected color(s), selected style(s), selected fabric(s), etc.) for each recommended fashion item. Current fashion items of the outfit z may be represented by feature vectors (sometimes referred to herein as "visual feature vectors" or "visual feature representations"). For a given fashion item of the current outfit z, the corresponding feature vector may be determined, in part, using a visual feature extractor function sometimes denoted herein by the function $f$. The visual feature extractor function $f$ may receive input image data and output a feature vector of length M that is representative of the input image data. In other words, the visual feature extractor function $f$ may be effective to generate vector representations (or other numeric representations) of input image data. In addition, an attribute feature vector may be used to represent the attributes of a particular item (e.g., color, style, fabric, etc.). Feature vectors representing fashion items may be a concatenation of the visual feature vector with the attribute feature vectors (sometimes referred to as "attribute vectors"). In various examples, different dimensions of the attribute vector may represent different attributes. For example, the attribute vector may be a 30 dimensional vector with the first 5 dimensions representing color, the next 15 dimensions representing style and the final 10 dimensions representing fabric. In various examples, feature vectors for fashion items stored in repository 120 may be stored in non-transitory computer-readable memory 103 in association with the image data used to generate the feature vector. In various examples, the function $f$ may be learned or may be a static function. In various examples, the visual feature extractor function $f$ may be a layer output of a pre-trained network. For example, layer FC6 or another fully connected layer or convolutional layer of AlexNet may be used. In some other examples, a Siamese neural network architecture, convolutional neural network, visual transformer, and/or a triplet-based approach may be used.

Recurrent neural network 122 may receive input feature vectors representing fashion items and/or accessories currently selected for an outfit z (and the attributes of such fashion items) along with an indication of a next category $c_{z+1}$ for which a recommendation is to be generated and selected attributes for the next fashion item $a_{z+1}$. Recurrent neural network 122 is described in additional detail below in the description of FIGS. 2A, 2B. Recurrent neural network 122 may generate a feature vector 130 for each category c for which a recommendation is requested. The feature vector 130 may encode a visually complementary item relative to current items of the outfit. Additionally, the feature vector 130 may encode the selected attributes 118. Visual search component 132 takes in feature vector 130 of length M and finds the image data in repository 120 closest to feature vector 130 by computing the distance between the feature vector 130 and $\{f(I_1), \ldots, f(I_N)\}$ (e.g., the set of feature vectors associated with the image data stored in repository 120). Since the feature vectors stored in repository 120 also include representations of item attributes, a search of the feature space using the feature vector 130 may return items having the selected attributes 118. The distance between the vectors may be determined in any suitable manner. For example, the Euclidean distance and/or cosine similarity between the vectors may be determined. When a recommendation is requested for a particular category of clothing, visual search component 132 may conduct a search over only those feature vectors that correspond to the requested category c. At action 140, system 100 outputs the image result(s) of the image data/stored in repository 120 with feature vectors that most closely match feature vector 130. In various examples, the top 10, 15, 20, etc. image results may be transmitted for display to the user on the user's computer display (not shown in FIG. 1A).

FIG. 1B depicts a first example display of the GUI 190 that may be used with the various outfit recommendation systems and techniques described herein. In the example GUI depicted in FIG. 1B, a personalized title 1002 is depicted for the current user profile. In some examples, a user may select the personalized title 1002 (and/or the profile name (e.g., "Maya")) as an ingress point to switch user profiles (e.g., selectable graphical control effective to generate control inputs that log out a current user profile and/or log in a different user profile). As previously described different settings (e.g., filter settings, etc.) may be associated with a given user profile. In an example, if no user profile is selected, a guest profile may be used. Default filter settings may be set for the guest profile. However, the guest user may change the default filter settings, as desired. Different filters 1004 are represented in FIG. 1B using drop-down selectable graphical controls that enable the user to select, for example, categories for recommendation, a maximum price, minimum price, and/or price range(s), weather, season, clothing attributes (not shown in FIG. 1B), etc. Additionally, in the example GUI shown in FIG. 1B, there is a slider bar (e.g., a selectable control element of the GUI) enabling the user to select a level of formality for the current recommended fashion items. For example, the "Dress it down" end of the slider spectrum may be used to generate recommendations that are more casual in nature, while the "Dress it up" end of the spectrum may be used to generate recommendations that are more formal in nature. In various examples, different fashion items available for recommendation (e.g., fashion items represented by data stored in repository 120) may be associated with metadata indicating a category of the fashion item, one or more seasons associated with the fashion item, weather associated with the fashion item, attributes associated with the fashion item, price, etc. Accordingly, in some examples, various filters specified via the GUI 190 may be used to filter recommendations based on the metadata associated with the various fashion items.

The example GUI depicted in FIG. 1B shows visually complementary fashion items 1006a, 1006b, 1006c, 1006d for the current outfit. In various examples, one or more of the fashion items 1006a, 1006b, 1006c, 1006d may be the seed items used for recommendation of the remaining fashion items 1006a, 1006b, 1006c, 1006d. Additionally, in the example depicted in FIG. 1B, each of the fashion items 1006a, 1006b, 1006c, 1006d represents a different category of fashion item. For example, fashion item 1006a represents outerwear (e.g., category: "jackets & coats"), fashion item 1006b represents a skirt (e.g., category: "bottoms"), fashion item 1006c represents a shirt (e.g., category: "shirts & tops"), fashion item 1006d represents a pair of shoes (e.g., category: "shoes"), etc. Each of the displayed fashion items 1006a, 1006b, 1006c, 1006d may represent a result among a list (e.g., a ranked list) of fashion items output by the outfit recommendation system based on an input seed item(s). Accordingly, in the example depicted in FIG. 1B, there are selectable controls (e.g., left and right arrows) that may be selected by the user to see other examples of recommended items of the particular category. For example, the user may not like the shoes currently displayed as fashion item 1006d. Accordingly, the user may select the left or right arrow to see other recommended shoes for the current outfit. In various examples, an initial ranked list of recommended items may be filtered according to specified filter settings to determine an updated ranked list for the current user profile. Although many of the example GUIs depicted in FIGS. 1B-1I show four items, it should be appreciated that any number of items may be selected as seed items and that any number of items may be recommended based on the seed items using the various techniques and systems described herein.

An image 1020 of a model wearing the currently-displayed fashion items 1006a, 1006b, 1006c, 1006d may be displayed so that the user can see the outfit worn by a person (or by a dress form and/or other representation (e.g., an avatar, cartoon, user-selected image, etc.). In the example depicted in FIG. 1B, a selectable graphical control 1008 is provided to allow the user to customize the image 1020 of the model. In various examples, the user may be able to alter the body type, height, weight, hair style, skin tone, and/or other features of the model's appearance. For example, the user may alter the appearance of the model to resemble the user's own appearance so that the user may see what the current outfit looks like if worn by a person that resembles the user in one or more ways. In some examples, the user may upload one or more images and/or videos of the user and an augmented reality rendering system may be used to display the image(s) of the user wearing the currently-displayed fashion items 1006a, 1006b, 1006c, 1006d, etc. In various examples, as the user selects different fashion items and/or the outfit recommendation system shows different recommendations on the GUI the appearance of image 1020 may change in real time, dynamically, to reflect the change in one or more fashion items such that the model in image 1020 may appear to always be wearing the fashion items in the currently-displayed outfit.

In the example depicted in FIG. 1B, a selectable graphical control 1012 may be used to like the currently-recommended and displayed outfit. In various examples, the like may serve as a signal to the underlying machine learning algorithms used to recommend outfits so that the outfit recommendation may personalize the outfit recommendations according to the user's tastes. In some examples, outfits liked by the user may be stored in user profile storage and may be accessible via the application (or website) providing the GUI such that the user may later review the different outfit recommendations that the user has previously liked. Additionally, in the example shown in FIG. 1B, a selectable graphical control 1010 is shown. The selectable graphical control 1010 may be used to share and/or save the current outfit recommendation (e.g., with other users, etc.).

FIG. 1C depicts another example display of the GUI 190 that may be used with the various outfit recommendation systems and techniques described herein. In the example GUI depicted in FIG. 1C, a bottom sheet 1014 is shown that the user may pull up using an upward swipe operation on a touchscreen display. In the example, the bottom sheet 1014 allows the user to switch between different user profiles that have been saved. For example, selection of user profile 1016 allows the user to select the saved user profile for "Maya", while selection of user profile 1018 allows the user to select the saved user profile for "Ben." Additionally, the user may add other profiles. As previously described, the outfit recommendations (including the underlying machine learning models) and/or filter settings may be personalized and/or stored in non-transitory computer-readable memory for each different user profile. It should be appreciated that although a bottom sheet with a "swipe up" implementation is shown in FIG. 1C, the GUI may instead offer numerous other ways for accessing and/or switching between user profiles.

Figure 1D:
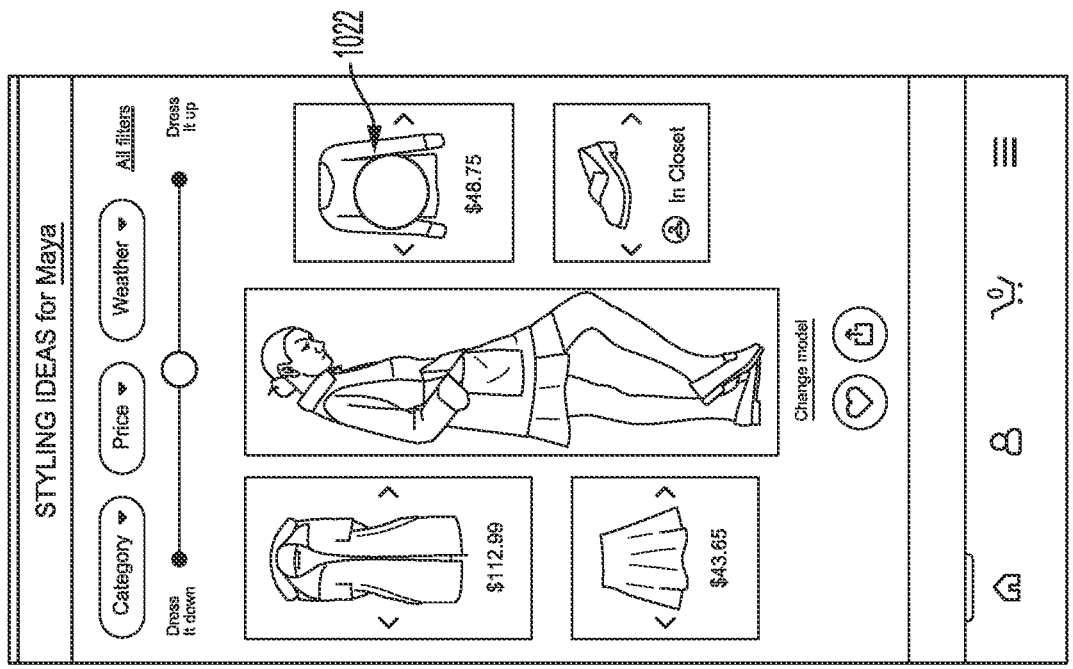

FIG. 1D depicts another example display of the GUI 190 that may be used with the various outfit recommendation systems and techniques described herein. In the example GUI depicted in FIG. 1D, selecting a recommended fashion item (e.g., using touch input 1022) may cause the GUI to transition from the GUI depicted in FIG. 1D to the GUI depicted in FIG. 1E, in which a sheet 1023 may be displayed that enables various functionality relative to the currently-selected fashion item. In the example depicted in FIG. 1E, the sheet 1023 may enable the user to like the fashion item, add the fashion item to the user's profile storage (e.g., "add to my closet"), share the fashion item (e.g., with one or more other users), dislike the fashion item, and/or like the fashion item. Adding an article to the user's closet may include generating label data stored in association with the user's profile that labels the fashion item as being owned by the user and/or otherwise associated with the user profile. In various examples, the selectable heart icon may act as both a "like" for the fashion item as well as a command to store the fashion item among other fashion items for which the heart icon was displayed. Further, the like (e.g., thumbs up) icon, the heart icon, and the dislike icon (e.g., the thumbs down icon) may act as signals to the various machine learning models described herein and may be used to personalize the training of the machine learning models in order to tailor outfit recommendations to the particular user profile.

FIG. 1F depicts another example display of the GUI 190 that may be used with the various outfit recommendation systems and techniques described herein. In the example GUI depicted in FIG. 1F, the user has selected the "Category" graphical selectable control 1026 which may cause the sheet 1024 to be displayed showing different graphical selectable controls pertaining to different categories. In the example of FIG. 1F, icons represent the types of categories. For example, a button down shirt icon is shown for the category "Shirts & tops," etc. In the example, the user has selected the categories "Shirts & tops", "Bottoms", "Jackets & coats", and "Shoes." Accordingly, the current outfit may depict recommended items from these categories (in addition to any seed items used for the recommendation). If no seed items are provided, the outfit recommendation system may recommend items based on past user preferences.

FIG. 1G depicts a transition from the GUI in FIG. 1F upon the user selecting a different set of categories from sheet 1024. In the example GUI depicted in FIG. 1G, the user has de-selected the categories "Shirts & tops" and "Bottoms" and has selected the categories "Purses & handbags" and "Dresses & jumpsuits." Accordingly, since "Bottoms" is no longer selected, the skirt displayed as a recommended fashion item 1028 in FIG. 1F has been replaced with the handbag displayed as a recommended fashion item 1030 in FIG. 1G. Accordingly, as the user changes various filters (such as the category filter, weather filter, price filter, attribute filter, etc.), the image 1020 of the model may change in real time, as well as the individual images of recommended of fashion items.

Figure 1I:
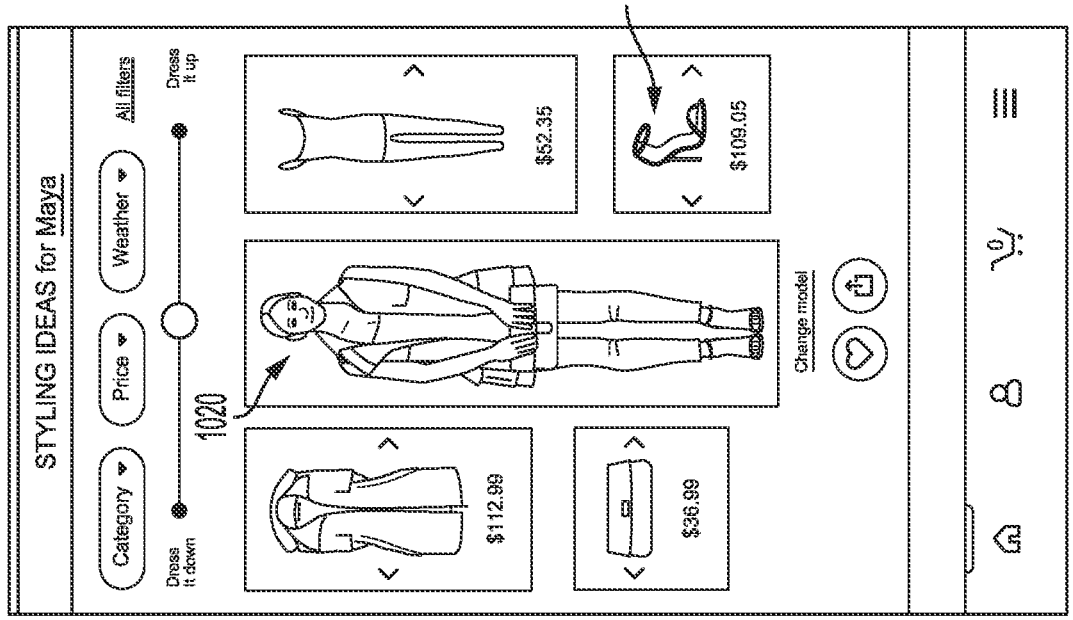
Figure 1H:
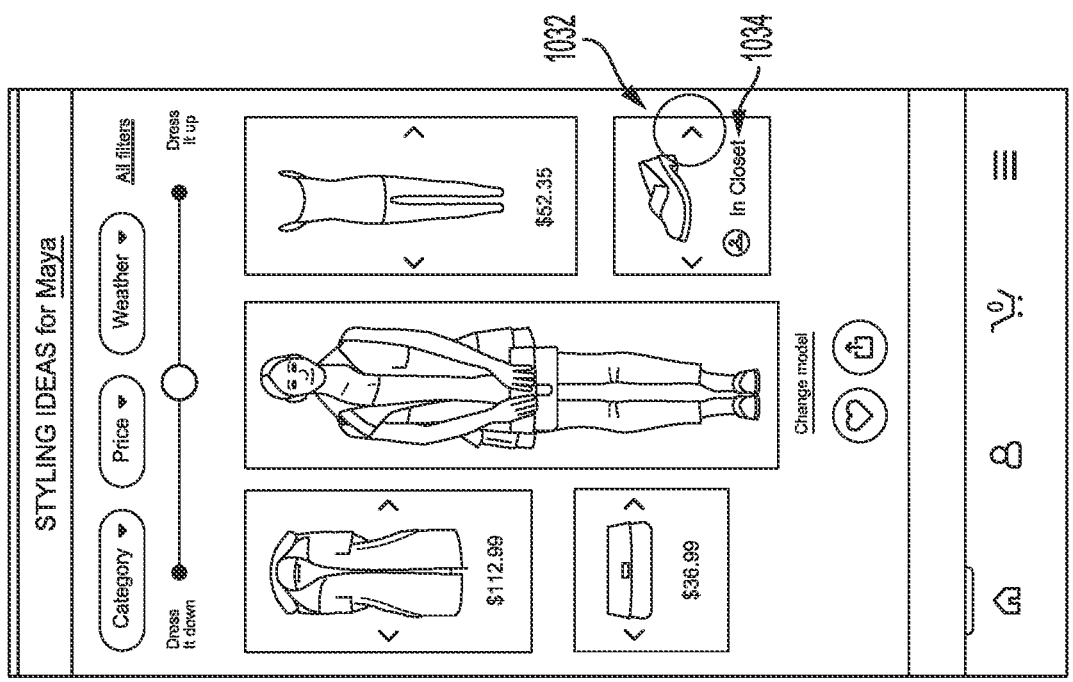

FIG. 1H depicts another example display of the GUI 190 that may be used with the various outfit recommendation systems and techniques described herein. In the example GUI depicted in FIG. 1H, the user may select the selectable graphical control 1032 to cycle among different recommended fashion items for a given category. For example, the machine learning models described herein may output a ranked list of items of a given category and/or set of attributes (and/or other filter settings). In an example, initially, the GUI 190 may display the top-ranked fashion item of a given category. Thereafter, the user may select a selectable graphical control to see other recommended items among the recommendations determined using the outfit recommendation system (e.g., other fashion items of the given filter settings among the ranked list). In an example, an indicator 1034 may indicate those items that the user has previously designated as being part of the user's wardrobe (e.g., by selecting the add selectable graphical control with respect to the item on sheet 1023 of FIG. 1E).

Upon selection of the selectable graphical control 1032 to change the recommended shoes, the display may transition from FIG. 1H to FIG. 1I (for example). In the example GUI of FIG. 1I, the recommended shoes 1036 have changed from those displayed in FIG. 1H. Additionally, image 1020 of the model is now shown wearing the currently-recommended shoes 1036 (which are different than the shoes shown on the image of the model in FIG. 1H) to reflect the updated outfit recommendation.

Figure 2A:
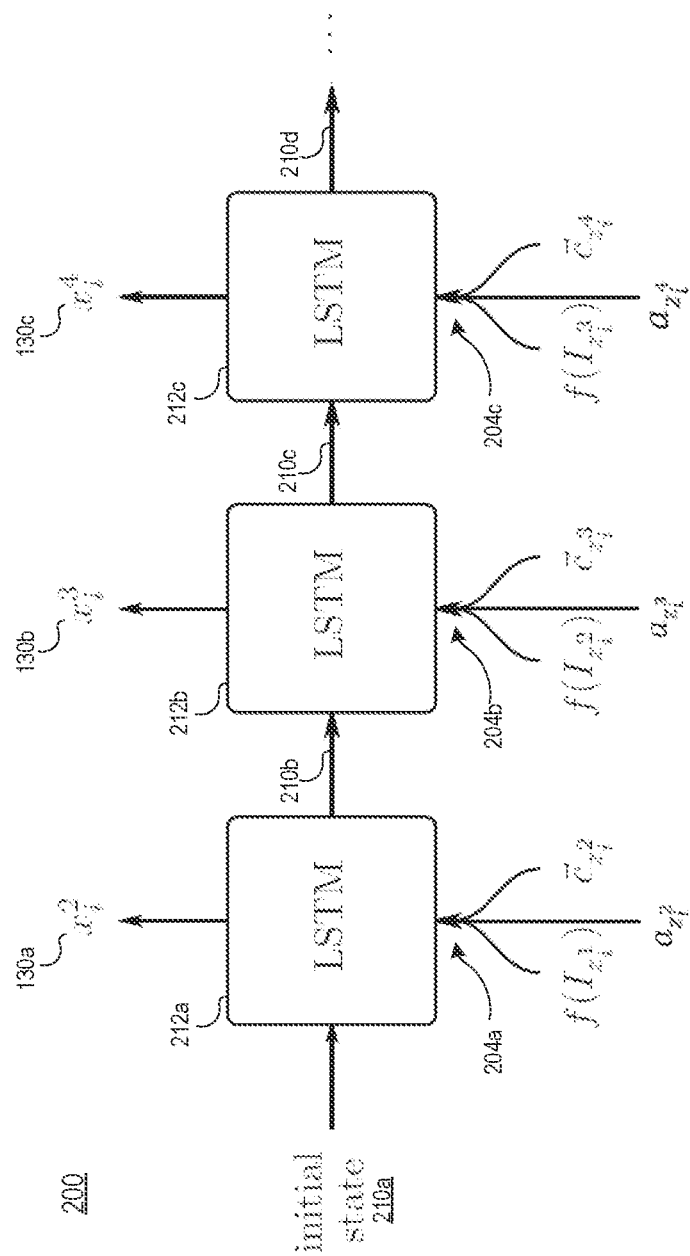
FIG. 2A depicts an example recurrent neural network effective to perform attribute-aware outfit recommendation, in accordance with various aspects of the present disclosure.

FIG. 2A depicts an example of the recurrent neural network 122 of FIG. 1A that may be used to perform attribute-aware outfit recognition in various embodiments. Those components in FIG. 2A that have been described above in reference to FIGS. 1A-1I may not be described again below, for purposes of clarity and brevity. In FIG. 2A, a long short-term memory (LSTM) neural network 200 is able to store values (e.g., state information regarding previously-selected fashion items in an outfit) over variable intervals (e.g., during the recommendation of a variable number of new fashion items for the outfit). In other applications, LSTM networks, or LSTMs, are used in text-based problems to predict sequences of words (e.g., the LSTMs model how to advance from word to word in one or more sentences based on previous words in the one or more sentences). Accordingly, the outfits z may comprise an ordered list of fashion items (e.g., {shirt, pants, shoes, bags, jewelry}). However, during training of the LSTM 200, the order may be repeatedly randomized in order to approximate an order-invariant process.

During training a set of ground truth outfits $\mathcal{Z}$ is provided. Outfit $z \in \mathcal{Z}$ is a vector of integers having $|z|$ fashion items, where the j-th element, $z^j$, is an index into repository 120 ($R = \{(I_j, c_j, a_j)\}_{j=1}^{N}$) where a is the attribute vector. Although z is ordered, as previously mentioned, the order is repeatedly scrambled (e.g., randomized) to approximate an order-invariant process. Training may be used to produce a recurrent neural network 122 (e.g., the LSTM 200 depicted in FIG. 2A and the LSTM 240 depicted in FIG. 2B) that: for an outfit z, given items $(I_{z^1}, c_{z^1}, a_{z^1}), \ldots, (I_{z^t}, c_{z^t}, a_{z^t})$, produces a visual feature vector for category $c_{z^{t+1}}$, denoted $x^{t+1}$ so that $f(I_{z^{t+1}}) \approx x^{t+1}$ where $x^{t+1}$ represents the selected attributes $a_{z^{t+1}}$. After training, inputting $x^{t+1}$ into visual search component 132 of FIG. 1A may result in a top retrieval result for $I_{z^{t+1}}$ from repository 120. In various examples described herein, the attribute vector for ground truth outfits z stored in repository 120 may be determined using named entity recognition processing to recognize text describing those attributes in the description of the item. For example, named entity recognition may be used to identify color words such as "red", "blue", "magenta", "seafoam", etc., according to pre-defined gazetteers. Similar gazetteers may be provided for each attribute of interest. Identified attributes may be encoded into a vector (e.g., an attribute vector). Accordingly, during training, the ground truth attribute vectors may be provided together with feature vectors $I_j$ and category vectors $c_j$.

During each epoch of training, the attributes of each ground truth fashion item (of an outfit z) to be included in each attribute vector $a_z$ may be randomly selected. This allows the model to learn to predict fashion items with any set of selected attributes (including cases where no attributes are selected). For example, for a first training instance the color of a shoe may be selected as the sole attribute to be represented by the attribute vector (with all other values of the attribute vector being zero). However, a different training instance that includes a different shoe may have the attributes color and fabric. Another training instance may have all defined attributes, while yet another training instance may have no attributes specified. Training the recurrent neural network in such a way allows the model to recommend fashion items regardless of whether one or more attributes are specified.

In FIG. 2A, the input into each cell of the LSTM 200 is state information 210 (including, for example, state information 210a, 210b, 210c, 210d, etc.) and an input vector 204 of size M+K (including, for example, input vectors 204a, 204b, 204c, etc.). State information 210 may comprise state vectors. Input vector 204 may sometimes be referred to herein as a "combined input vector". The input vector 204 may be a concatenation of a visual descriptor feature vector (e.g., $f(I_{z^1})$, etc.), an attribute vector (e.g., $a_{z^1}$) and a one-hot encoded category vector $\vec{c}^1$ (e.g., in place of the category label c). Each cell yields an updated state vector and an output feature vector 130 of size M. The output feature vector 130 may also encode the selected attributes. Although, three cells 212a, 212b, and 212c are depicted in FIG. 2A for exemplary purposes, any number of cells may be used in accordance with the various techniques described herein.

Initial state 210a may be the zero vector. The input to each cell of the LSTM is a visual descriptor feature vector (e.g., $f(I_{z^1})$, etc.) for a selected item of an outfit and the next item's category (e.g., the item category for a recommendation is to be generated—e.g., hats, scarves, shoes, etc.) and selected attributes for the next item. The output of each cell is an output feature vector that may be used as an input to visual search component 132 of FIG. 1A in order to produce a set of one or more recommended fashion items from the requested category (and having the selected attributes) and an updated state vector. The updated state vector includes current known information regarding the selected fashion items comprising the outfit.

In the example depicted in FIG. 2A, cell 212a may receive initial state 210a (e.g., the zero vector) and may receive combined input vector 204a comprising the visual descriptor feature vector $f(I_{z^1})$ concatenated with the one-hot encoded category vector $\vec{c}_{z_i^2}$ and the attribute vector $a_{z_i^2}$ (representing the selected attributes for the next fashion item). Cell 212a may generate output feature vector 130a (e.g., $x_i^2$). Output feature vector 130a may be used by visual search component 132 to search repository 120 over the set of image data in repository 120 with feature vectors corresponding to category vector $\vec{c}_{z_i^2}$. Additionally, cell 212a may generate updated state information 210b. Updated state information 210b may comprise data indicating a current state of the outfit z including the visual descriptor feature vector $f(I_{z^1})$ and the selected attributes corresponding to a selected item of the outfit z.

Cell 212b may receive updated state information 210b from cell 212a. Additionally, cell 212b may receive input vector 204b comprising the visual descriptor feature vector $f(I_{z^2})$ concatenated with the one-hot encoded category vector $\vec{c}_{z_i^3}$ and the attribute vector $a_{z_i^3}$. In the example, category vector $\vec{c}_{z_i^3}$ may represent the next category of fashion items for which a recommendation is requested for the current outfit recommendation. In the example, $I_{z^2}$ may represent an image selected by the user from among the results of the visual search of image data in repository 120 (e.g., in category $\vec{c}_{z_i^2}$) using output feature vector 130a (e.g., $x_i^2$) from cell 212a. However, $I_{z^2}$ need not be selected from repository 120. For example, $I_{z^2}$ may represent newly uploaded image data depicting an fashion item. Cell 212b may generate output feature vector 130b (e.g., $x_i^3$). Output feature vector 130b may be used by visual search component 132 to search repository 120 over the set of image data in repository 120 with feature vectors corresponding to category vector $\vec{c}_{z_i^3}$. Additionally, cell 212b may generate updated state information 210c. Updated state information 210c may comprise data indicating a current state of the outfit z including the visual descriptor feature vectors $f(I_{z^1})$ and $f(I_{z^2})$ corresponding to selected items of the outfit z.

Cell 212c may receive updated state 210c from cell 212b. Additionally, cell 212c may receive input vector 204c comprising the visual descriptor feature vector $f(I_{z^3})$ concatenated with the one-hot encoded category vector $\vec{c}_{z_i^4}$ and the attribute vector $a_{z_i^4}$. In the example, category vector $\vec{c}_{z_i^4}$ may represent the next category of fashion items for which a recommendation is requested for the current outfit recommendation. In the example, $I_{z^3}$ may represent an image selected by the user from among the results of the visual search of image data in repository 120 (e.g., in category $\vec{c}_{z_i^3}$) using output feature vector 130b (e.g., $x_i^3$) from cell 212b. However, $I_{z^3}$ need not be selected from repository 120. For example, $I_{z^3}$ may represent image data depicting an fashion item that is not stored in repository 120, but has been selected by the user. Cell 212c may generate output feature vector 130c (e.g., $x_i^4$). Output feature vector 130c may be used by visual search component 132 to search repository 120 over the set of image data in repository 120 with feature vectors corresponding to category vector $\vec{c}_{z_i^4}$. Additionally, cell 212c may generate updated state information 210d. Updated state information 210d may comprise data indicating a current state of the outfit z including the visual descriptor feature vectors $f(I_{z^1})$, $f(I_{z^2})$, and $f(I_{z^3})$ corresponding to selected items of the outfit z.

Figure 2B:
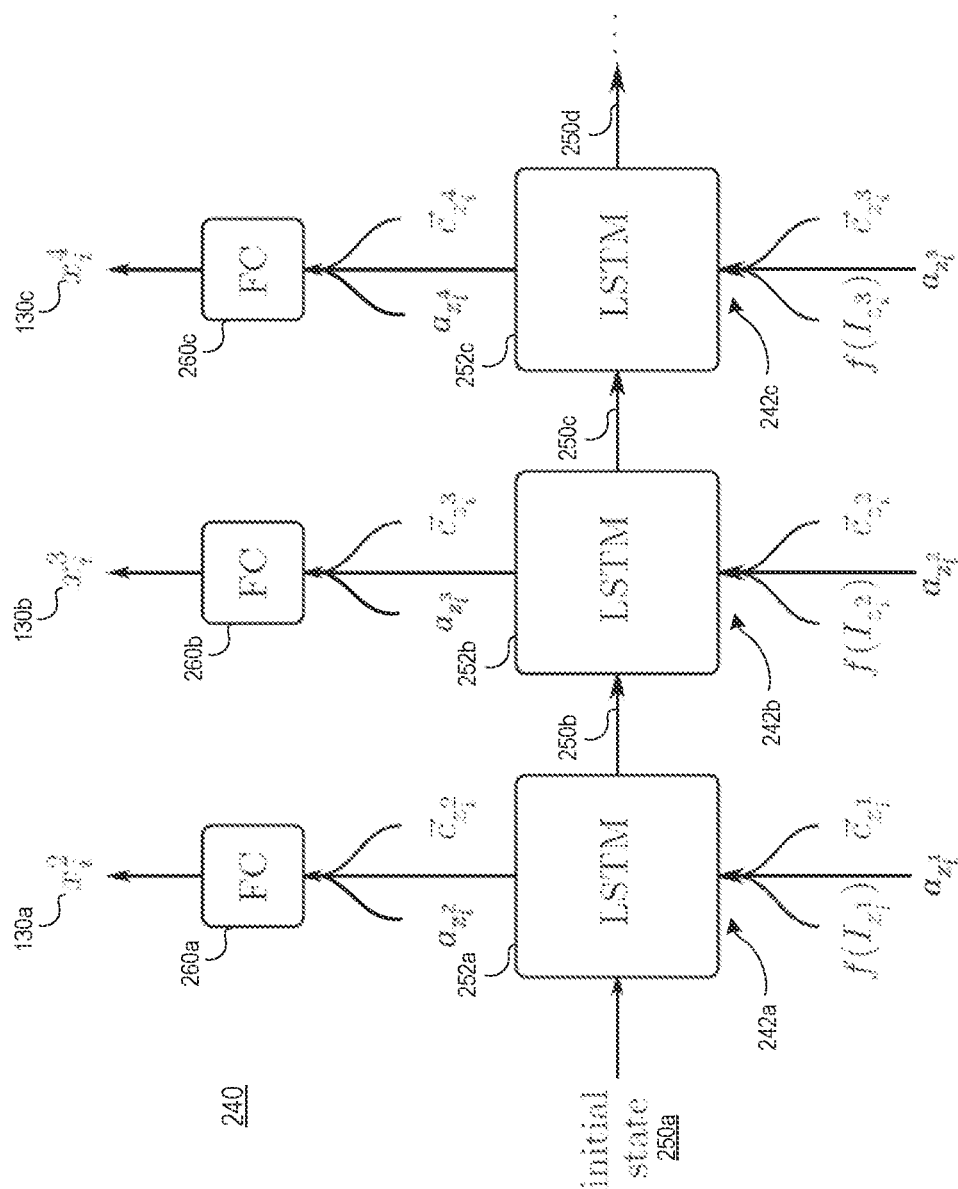
FIG. 2B depicts another example of a recurrent neural network effective to perform attribute-aware outfit recommendation, in accordance with various aspects of the present disclosure.

FIG. 2B depicts another example of recurrent neural network 122 of FIG. 1A that may be used to perform outfit recognition in various embodiments. Those components in FIG. 2B that have been described above in reference to FIGS. 1 and 2A may not be described again below, for purposes of clarity and brevity.

In the example recurrent neural network depicted in FIG. 2B, the input to each cell of the LSTM 240 is a state vector 250 (including, for example, state vectors 250a, 250b, 250c, 250d, etc.) and an input vector 242 of size M+K (including, for example, input vectors 242a, 242b, 242c, etc.).

In the example depicted in FIG. 2B, the initial state vector 250a may be the zero vector. The input to each cell of the LSTM may be a visual descriptor feature vector (e.g., $f(I_{z^1})$, etc.), the one-hot encoded category vector 21 corresponding to the current visual descriptor feature vector, and the attributes a corresponding to the current visual descriptor feature vector. The updated state vector (e.g., updated state vectors 250b, 250c and 250d) may include current known information regarding the selected fashion items comprising the outfit.

An output of each cell may be concatenated with the next item's category and/or the next item's attributes to generate a combined output feature vector and provided to a fully connected layer network (including fully connected layers 260a, 260b and/or 260c). Fully connected layers 260a, 260b and/or 260c may be multi-layer perceptron cells. Fully connected layers 260a, 260b and/or 260c are provided by way of example only. In various other implementations, convolutional layers and/or other neural network components may be used instead.

In the example depicted in FIG. 2B, the output of fully connected layers 260a, 260b and 260c may be the output feature vectors 130a, 130b and 130c, respectively. As previously described, the output feature vectors 130a, 130b, and 130c may be used by visual search component 132 of FIG. 1A to search repository 120 over the set of image data in repository 120 with feature vectors corresponding to the appropriate category vectors. Additionally, each cell 252 (including cells 252a, 252b, and 252c) may generate updated state information (e.g., updated state vectors 250b, 250c, and 250d). The updated state information may comprise data indicating a current state of the outfit z including the visual descriptor feature vectors $f(I_{z^1})$, $f(I_{z^2})$, and $f(I_{z^3})$ corresponding to selected items of the outfit z.

In the example recurrent neural network depicted in FIG. 2B, the input into the LSTM is based on user selection rather than a user's request for a next category. Instead, the output of the LSTM is coupled with the requested category. The concatenated output of the LSTM and requested next item category are input into the fully connected network (e.g., fully connected layers 260a, 260b, and/or 260c) to generate the output feature vectors 130a, 130b, and/or 130c. As such, in the recurrent neural network depicted in FIG. 2B, the internal state is decoupled from user category requests.

Figure 3:
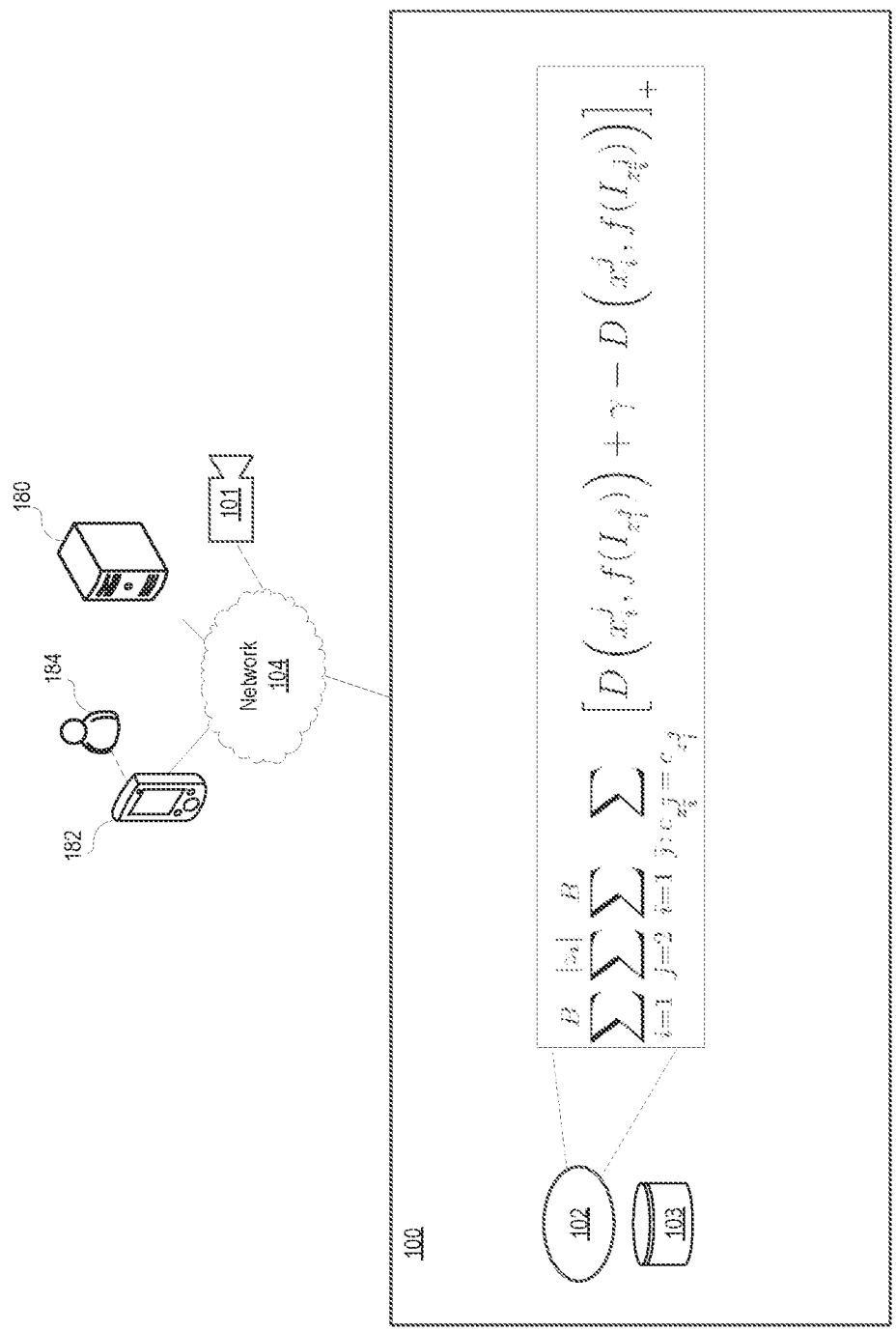
FIG. 3 depicts a loss function that may be minimized in accordance with the outfit recommendation techniques described herein.

FIG. 3 depicts a loss function that may be minimized during training of a recurrent neural network, in accordance with the outfit recommendation techniques described herein. Those components in FIG. 3 that have been previously described in reference to FIGS. 1 and 2 may not be described again herein for purposes of clarity and brevity.

Various loss functions may be used to characterize the outfit recommendation model and may be minimized on a particular training set. In various examples, a loss function may express the discrepancy between the predictions of the outfit recommendation model being trained and the actual repository instances. FIG. 3 depicts a triplet loss function that mimics retrieval at a batch level. The output visual descriptor feature vector (e.g., output feature vectors 130a, 130b, 130c, etc.) is encouraged to be closer to the actual visual descriptor feature vector of the repository 120 (e.g., $f(I_{z^1})$, $f(I_{z^2})$) when compared with all other visual descriptor feature vectors belonging to the same category. The truncated retrieval is performed at the batch level. The equation depicted in FIG. 3 is minimized for a batch of B outfits, B={$z_1$, . . . , $z_B$}. D is a distance function (e.g., Euclidean distance) that computes the distance (e.g., dissimilarity) between two pairs of vectors. The first vector is the output feature vector of the recurrent neural network (e.g., $x_i^3$ from the LSTM 240 depicted in FIG. 2B). The second vector represents targets (e.g., feature vectors) from the same class for the batch that are not of interest (for purposes of training). γ is a margin parameter used to "steer" the training process to form a buffer between the desired discrepancy and undesired discrepancies. For example, if the margin is 0.2, the loss function penalizes the mini-retrieval when D (x, non-target)<D (x, target)+0.2. [·]+ is the positive part function. The first two summations traverse all image descriptors in all of the outfits from the second item onward. The next two summations extract all image descriptors in the batch that match the category of item $z_i^j$.

Figure 4:
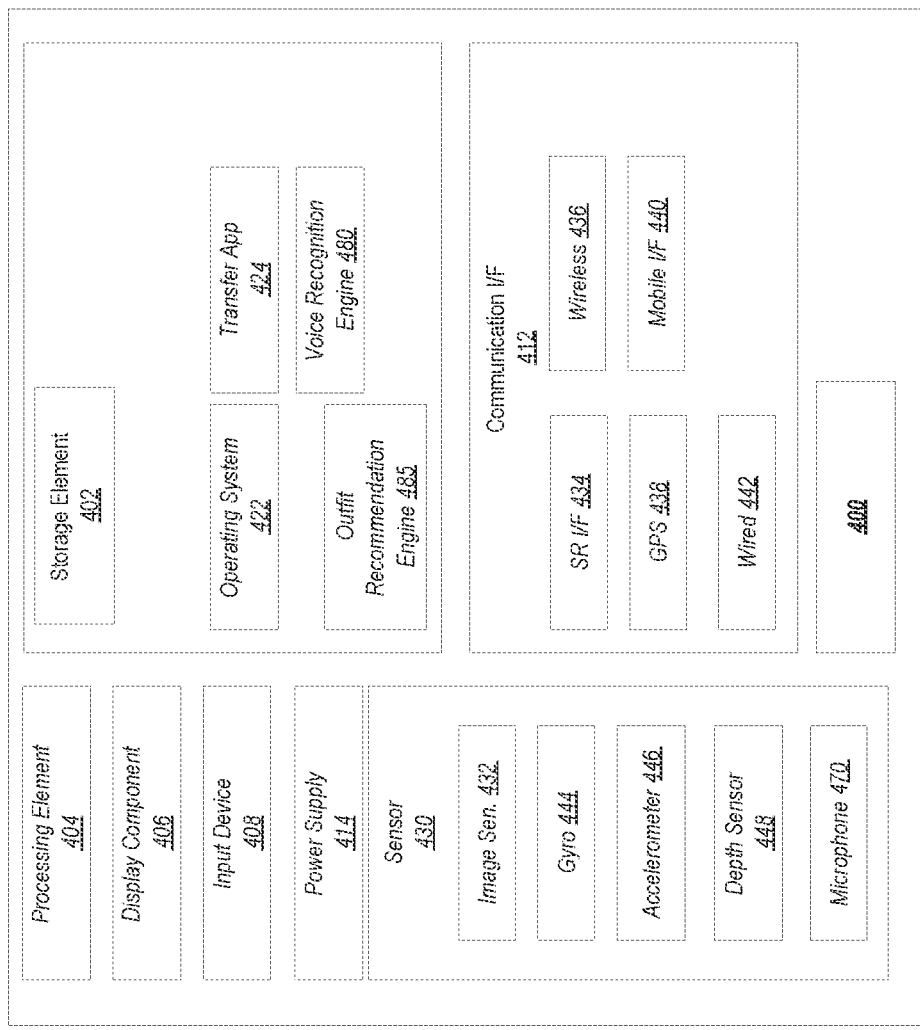
FIG. 4 is a block diagram depicting an example architecture of a computing device that may be used in accordance with various aspects of the present disclosure.

FIG. 4 is a block diagram showing an example architecture 400 of a computing device, such as the system 100 and/or remote computing device(s) 180, and/or other computing devices described herein. It will be appreciated that not all user devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to perform outfit recommendation techniques, as described above. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the user device and may facilitate communications and commands between applications executing on the architecture 400 and various hardware thereof. A transfer application 424 may be configured to send and/or receive image and/or video data to and/or from other devices (e.g., a mobile device, remote device, image capture device, and/or display device). In some examples, the transfer application 424 may also be configured to upload the received images to another device that may perform processing as described herein (e.g., a mobile device or another computing device).

In various examples, outfit recommendation engine 485 may be effective to implement a recurrent neural network for outfit recommendation as described above in reference to FIGS. 1-3. Additionally, in various examples, outfit recommendation engine 485 may be effective to implement visual search component 132 and may search repository 120 for image data with feature vectors that match a target feature vector. As previously described, a recurrent neural network 122 may determine one or more target feature vectors based on a current outfit and one or more selected clothing article categories for which to receive recommendations.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 for capturing sounds, such as voice commands. Voice recognition engine 480 may interpret audio signals of sound captured by microphone 470. In some examples, voice recognition engine 480 may listen for a "wake word" to be received by microphone 470. Upon receipt of the wake word, voice recognition engine 480 may stream audio to a voice recognition server for analysis. In various examples, voice recognition engine 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other user devices. For example, the communication interface 412 may comprise a wireless communication module 436 configured to communicate on a network, such as the network 104, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors (e.g., camera 101 depicted in FIG. 1A). An image sensor 432 is shown in FIG. 4. Some examples of the architecture 400 may include multiple image sensors 432. For example, a panoramic camera system may comprise multiple image sensors 432 resulting in multiple images and/or video frames that may be stitched and may be blended to form a seamless panoramic output.

Motion sensors may include any sensors that sense motion of the architecture including, for example, gyro sensors 444 and accelerometers 446. Motion sensors, in some examples, may be used to determine an orientation, such as a pitch angle and/or a roll angle of a camera. The gyro sensor 444 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 446 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 438 may be utilized as a motion sensor. For example, changes in the position of the architecture 400, as determined by the GPS interface 438, may indicate the motion of the GPS interface 438.

In some examples, architecture 400 may include a depth sensor 448. Depth sensor 448 may be effective to determine a distance between image sensor 432 and a surface detected by depth sensor 448. In some examples, the depth sensor 448 may determine the contours of the surface and may be capable of using computer vision techniques to recognize facial patterns or other markers within the field of view of the depth sensor 448's infrared sensor. In some examples, the depth sensor 448 may include an infrared projector and camera. Processing element 404 may build a depth map based on detection by the infrared camera of a pattern of structured light displayed on a surface by the infrared projector. In some other examples, the depth sensor 448 may include a time of flight camera that may compute distance based on the speed of light by measuring the time of flight of a light signal between a camera of the depth sensor 448 and a surface of an environment. In some examples, processing element 404 may be effective to determine the location of various objects in the physical environment within the field of view of image sensor 432 based on the depth map created by the depth sensor 448. In some examples, non-infrared depth sensors, such as passive stereo camera pairs, or non-identical camera pairs, may be used in place of, or in addition to, infrared light sources of depth sensor 448.

Figure 5:
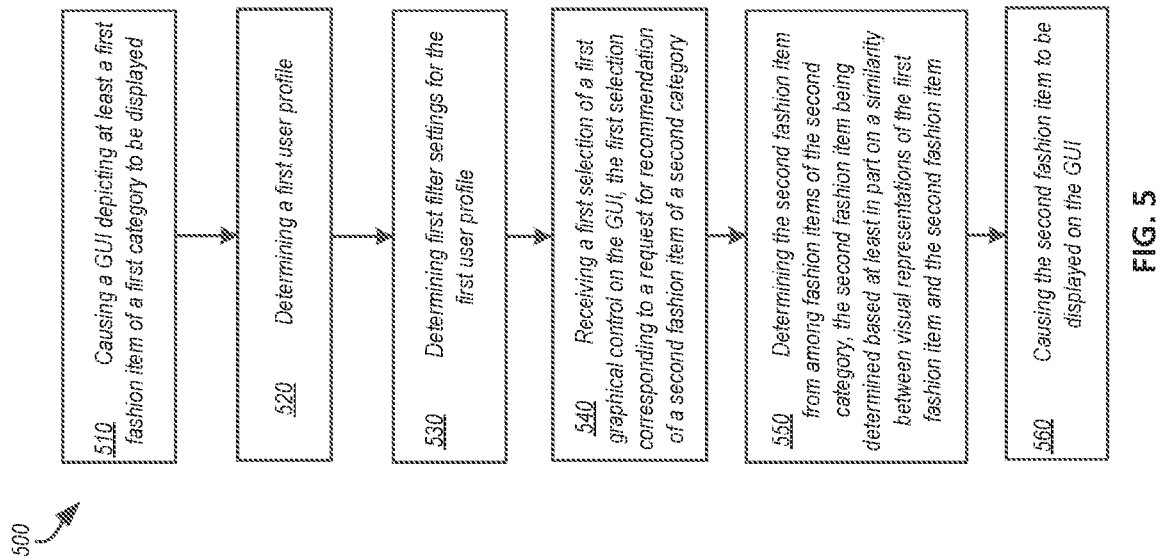
FIG. 5 depicts a flowchart illustrating an example process for real-time interactive outfit recommendation, in accordance with various embodiments of the present disclosure.

FIG. 5 depicts a flowchart illustrating an example process 500 for real-time interactive outfit recommendation, in accordance with various embodiments of the present disclosure. In some examples, the process of FIG. 5 may be performed by a user computing device, such as a mobile device. In some other examples, the process of FIG. 5 may be performed by one or more remote computing devices (e.g., remote computing device(s) 180). In some examples where the process of FIG. 5 is performed by one or more remote computing devices, a companion application on a mobile device and/or a web-based application may be used to control and/or interface with the outfit recommendation process performed by the remote computing device(s). In various examples, users may submit image data representing one or more fashion items owned, possessed, favorited, liked, or otherwise associated with a user to the remote computing device(s). In some examples, the remote computing device(s) may add such image data to repository 120. In some examples, repository 120 may comprise a user-account specific repository specific to image data of a particular user account. Accordingly, a user may upload their personal wardrobe as a portion of the repository 120 associated with the user's account. Additionally, the repository 120 may interface with one or more online databases to store image data of clothing available through one or more online resources (e.g., through an e-commerce site).

The process of FIG. 5 may begin at action 510, at which a GUI depicting at least a first fashion item of a first category may be caused to be displayed (e.g., on a mobile device). In various examples, a backend system (e.g., a web application) may provide instructions effective to cause the GUI to display the first fashion item of the first category. In other examples, an application may be executed locally (e.g., by a mobile device) and may cause the GUI to display various content. In various examples, the outfit recommendation machine learning algorithms may be executed locally with respect to the GUI, remotely, and/or some combination of locally and remotely. In some examples, the first fashion item of the first category may be a seed item that may be used to generate a recommendation for at least one other fashion item of an outfit.

Processing may continue at action 520, at which a first user profile may be determined. In various examples, the first user profile may be the profile that is currently logged in on the application providing the GUI. Various user profile data (including filter settings, model image settings, data related to fashion items owned by the user (e.g., in the user's "closet") may be stored in association with the user profile.

Processing may continue at action 530, at which first filter settings for the first user profile may be determined. First filter settings may include categories associated with the first user profile, price ranges associated with the first user profile, preferences associated with the first user profile (e.g., styles, colors, etc.), attributes associated with the first user profile, season information, etc.

Processing may continue at action 540, at which a first selection of a first graphical control on the GUI may be received. The first selection may correspond to a request for recommendation of a second fashion item of a second category. In various examples, the first selection of the first graphical control may include a control button effective to navigate to an "outfit recommendation" service of the application and/or a selection of one or more seed items for which additional fashion items should be recommended.

Processing may continue at action 550, at which the second fashion item may be determined from among fashion items of the second category (e.g., fashion items of the second category stored in repository 120). The second fashion item may be determined based at least in part on a similarity between visual representations of the first fashion item and the second fashion item. For example, a vector representation (or other numerical representation) of the current outfit (including the first fashion item may be determined). A recurrent neural network may generate a vector representation (or other numerical representation) of an item of the specified category (e.g., the second category). The vector representation may be used to perform visual search of items of the second category (e.g., using visual search component 132) to determine the closest items in the relevant feature space.

Processing may continue at action 560, at which the second fashion item may be displayed on the GUI. For example, in FIG. 1G, the user has selected the category "Purses & handbags" on sheet 1024. Thereafter, the image of the recommended handbag (e.g., recommended fashion item 1030) is determined and displayed on the GUI. Additionally, the image 1020 of the model is updated to be displayed with the handbag (see, e.g., FIGS. 1H and 1I).

Figure 6:
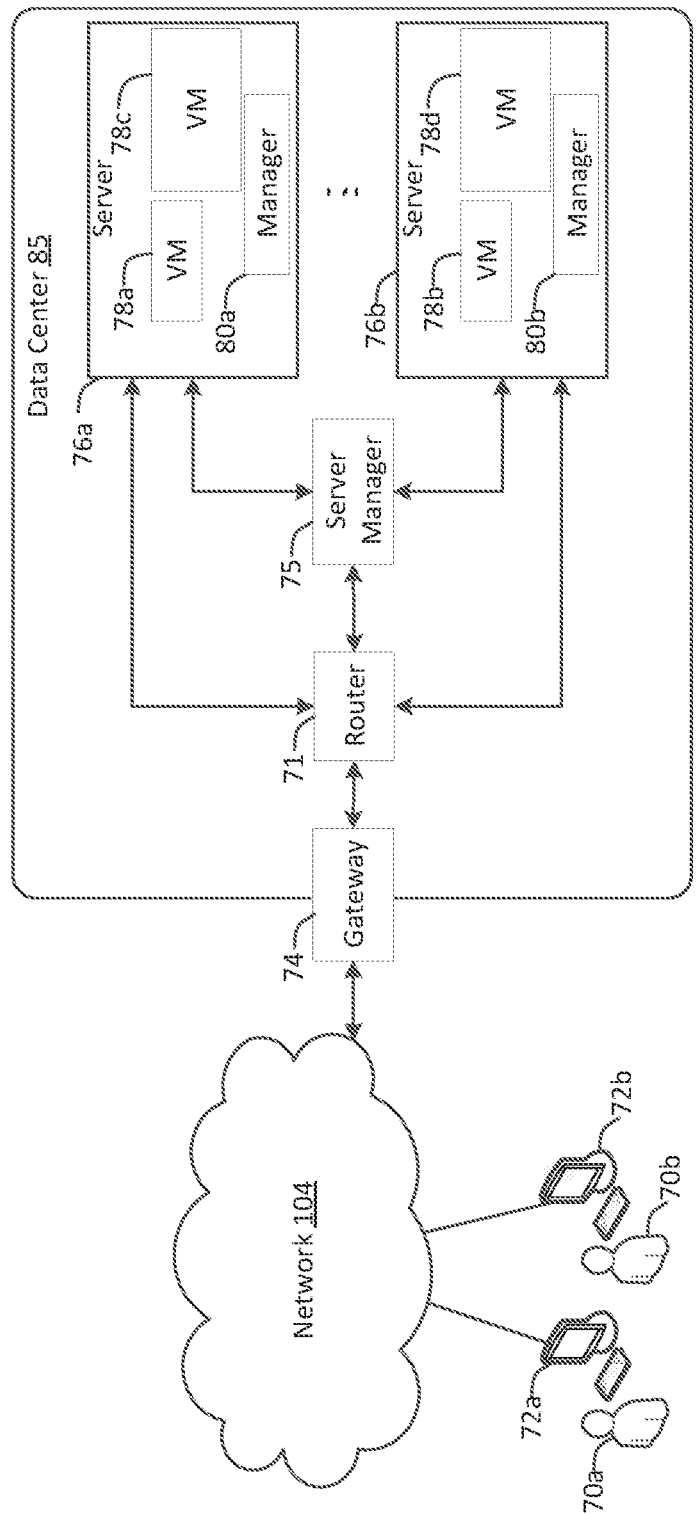
FIG. 6 depicts an example system for sending and providing data over a network, in accordance with various embodiments of the present disclosure.

An example system for sending and providing data will now be described in detail. In particular, FIG. 6 illustrates an example computing environment in which the embodiments described herein may be implemented. FIG. 6 is a diagram schematically illustrating an example of a data center 85 that can provide computing resources to users 70a and 70b (which may be referred herein singularly as user 70 or in the plural as users 70) via user computers or other network-connected devices 72a and 72b (which may be referred herein singularly as computer 72 or in the plural as computers 72) via network 104. In various examples, system 100 depicted in FIG. 1A may be an example of a computer or other network-connected device 72a and/or 72b. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and nonvolatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources-consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 6 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 6, a router 71 may be utilized to interconnect the servers 76a and 76b. Router 71 may also be connected to gateway 74, which is connected to network 104. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 6, a server manager 75 is also employed to at least in part direct various communications to, from and/or between servers 76a and 76b. While FIG. 6 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 85 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A computer-implemented method comprising:
    receiving, by a machine learning model, first training data comprising ground truth outfit data, the ground truth outfit data comprising first fashion item data and second fashion item data;
    inputting a first visual feature vector representing the first fashion item data into the machine learning model;
    generating, by the machine learning model using the first visual feature vector, a first predicted visual feature vector for the second fashion item data;

generating an updated machine learning model by decreasing a difference between the first predicted visual feature vector and a ground truth visual feature vector associated with the second fashion item data;

causing a first graphical user interface (GUI) to be displayed, the first GUI depicting at least a first fashion item image associated with a first category;

determining a first user profile;

determining first filter settings of the first user profile;

receiving a first selection of a first graphical control on the first GUI, the first selection corresponding to a request for a recommendation from a second category;

determining a second fashion item image from among a plurality of fashion item images of the second category, wherein the second fashion item image has been determined by the updated machine learning model based at least in part on a second predicted visual feature vector generated by the updated machine learning model using a visual feature vector for the first fashion item image, and wherein the second fashion item image is selected in accordance with the first filter settings of the first user profile; and causing the second fashion item image to be displayed on the first GUI.

2. The computer-implemented method of claim 1, further comprising:

causing a second graphical control to be displayed on the first GUI in association with the first fashion item image, wherein selection of the second graphical control is effective to label a fashion item associated with the first fashion item image as being owned by a user associated with the first user profile; and storing first data in a data store, the first data indicating that the fashion item associated with the first fashion item image is owned by the user associated with the first user profile.

3. The computer-implemented method of claim 1, further comprising:

causing a second graphical control to be displayed on the first GUI, wherein the second graphical control enables a selection between different types of weather;

receiving a selection of the second graphical control corresponding to a first type of weather prior to receiving the first selection of the first graphical control; and determining the second fashion item image by the updated machine learning model, wherein the second fashion item image is labeled with metadata indicating that the second fashion item image is associated with the first type of weather.

4. The computer-implemented method of claim 1, further comprising causing an image representing a person wearing a fashion item associated with the first fashion item image and a fashion item associated with the second fashion item image to be displayed.

5. The computer-implemented method of claim 4, further comprising:

receiving a selection of a second graphical control displayed in association with the second fashion item image, wherein the second graphical control is effective to cycle between recommended items;

replacing a display of the second fashion item image with a third fashion item image of the second category; and updating an appearance of the image representing the person such that the person is wearing the fashion item associated with the first fashion item image and a fashion item associated with the third fashion item image.

6. The computer-implemented method of claim 1, further comprising:

receiving control inputs effective to log out the first user profile and log in a second user profile;

causing the first GUI to be displayed for the second user profile, the first GUI depicting at least the first fashion item image associated with the first category;

receiving a second selection of the first graphical control on the first GUI, the second selection corresponding to a request for a recommendation of a third fashion item image of the second category; and determining the third fashion item image from among a plurality of fashion item images of the second category, wherein the third fashion item image has been determined by the updated machine learning model based at least in part on a similarity between the first fashion item image and the third fashion item image, and wherein the third fashion item image is selected in accordance with the first filter settings of the second user profile, wherein the third fashion item image is different from the second fashion item image.

7. The computer-implemented method of claim 1, further comprising determining the second fashion item image further based on geolocation data associated with the first user profile.

8. The computer-implemented method of claim 1, further comprising:

determining a ranked list of the plurality of fashion item images of the second category based at least in part on a similarity between the first fashion item image and the second fashion item image;

determining first data representing user filter selections received via the first GUI; and determining an updated ranked list of the plurality of fashion item images of the second category by filtering out one or more fashion item images based on the user filter selections, wherein the second fashion item image is among the fashion item images of the updated ranked list.

9. The computer-implemented method of claim 1, further comprising:

receiving a second selection of the first graphical control on the first GUI, the second selection corresponding to a request for a recommendation from a third category different from the first category and the second category;

determining a third fashion item image from among a plurality of fashion item images of the third category, wherein the third fashion item image has been determined by the updated machine learning model based at least in part on a similarity between the first fashion item image, the second fashion item image, and the third fashion item image; and causing the third fashion item image to be displayed on the first GUI along with the first fashion item image and the second fashion item image.

10. The computer-implemented method of claim 1, further comprising:

causing a second graphical control to be displayed on the first GUI, wherein the second graphical control enables a selection between different types of weather;

receiving a selection of the second graphical control corresponding to a first type of weather prior to receiving the first selection of the first graphical control; and determining the second fashion item image by the updated machine learning model, wherein the second fashion item image is labeled with metadata indicating that the second fashion item image is associated with the first type of weather.

11. A system, comprising:
   at least one processor; and
   non-transitory computer-readable memory configured to be in communication with the at least one processor, the non-transitory computer-readable memory effective to store instructions that, when executed by the at least one processor, cause the at least one processor to:
   receiving, by a machine learning model, first training data comprising ground truth outfit data, the ground truth outfit data comprising first fashion item data and second fashion item data;
   input a first visual feature vector representing the first fashion item data into the machine learning model;
   generate, by the machine learning model using the first visual feature vector, a first predicted visual feature vector for the second fashion item data;
   generate an updated machine learning model by decreasing a difference between the first predicted visual feature vector and a ground truth visual feature vector associated with the second fashion item data;
   cause a first graphical user interface (GUI) to be displayed, the first GUI depicting at least a first fashion item image associated with a first category;
   determine a first user profile;
   determine first filter settings of the first user profile;
   receiving a first selection of a first graphical control on the first GUI, the first selection corresponding to a request for a recommendation from a second category;
   determine a second fashion item image from among a plurality of fashion item images of the second category, wherein the second fashion item image has been determined by the updated machine learning model based at least in part on a second predicted visual feature vector generated by the updated machine learning model using a visual feature vector for the first fashion item image, and wherein the second fashion item image is selected in accordance with the first filter settings of the first user profile; and
   cause the second fashion item image to be displayed on the first GUI.

12. The system of claim 11, the non-transitory computer-readable memory storing further instructions that, when executed by the at least one processor, are further effective to cause the at least one processor to:
   cause a second graphical control to be displayed on the first GUI in association with the first fashion item image, wherein selection of the second graphical control is effective to label a fashion item associated with the first fashion item image as being owned by a user associated with the first user profile; and
   store first data in a data store, the first data indicating that the fashion item associated with the first fashion item image is owned by the user associated with the first user profile.

13. The system of claim 11, the non-transitory computer-readable memory storing further instructions that, when executed by the at least one processor, are further effective to cause the at least one processor to:
   cause a second graphical control to be displayed on the first GUI, wherein the second graphical control enables a selection between different types of weather;
   receive a selection of the second graphical control corresponding to a first type of weather prior to receiving the first selection of the first graphical control; and
   determine the second fashion item image by the updated machine learning model, wherein the second fashion item image is labeled with metadata indicating that the second fashion item image is associated with the first type of weather.

14. The system of claim 11, the non-transitory computer-readable memory storing further instructions that, when executed by the at least one processor, are further effective to cause the at least one processor to cause an image representing a person wearing a fashion item associated with the first fashion item image and a fashion item associated with the second fashion item image to be displayed.

15. The system of claim 14, the non-transitory computer-readable memory storing further instructions that, when executed by the at least one processor, are further effective to:
   receive a selection of a second graphical control displayed in association with the second fashion item image, wherein the second graphical control is effective to cycle between recommended items;
   replace a display of the second fashion item image with a third fashion item image of the second category; and
   update an appearance of the image representing the person such that the person is wearing the fashion item associated with the first fashion item image and a fashion item associated with the third fashion item image.

16. The system of claim 11, the non-transitory computer-readable memory storing further instructions that, when executed by the at least one processor, are further effective to cause the at least one processor to:
   receive control inputs effective to log out the first user profile and log in a second user profile;
   cause the first GUI to be displayed for the second user profile, the first GUI depicting at least the first fashion item image associated with the first category;
   receive a second selection of the first graphical control on the first GUI, the second selection corresponding to a request for a recommendation of a third fashion item image of the second category; and
   determine the third fashion item image from among a plurality of fashion item images of the second category, wherein the third fashion item image has been determined by the updated machine learning model based at least in part on a similarity between the first fashion item image and the third fashion item image, and wherein the third fashion item image is selected in accordance with the first filter settings of the second user profile, wherein the third fashion item image is different from the second fashion item image.

17. The system of claim 11, the non-transitory computer-readable memory storing further instructions that, when executed by the at least one processor, are further effective to cause the at least one processor to:
   determine the second fashion item image further based on geolocation data associated with the first user profile.

18. The system of claim 11, the non-transitory computer-readable memory storing further instructions that, when executed by the at least one processor, are further effective to cause the at least one processor to:
   determine a ranked list of the plurality of fashion item images of the second category based at least in part on a similarity between the first fashion item image and the second fashion item image;

determine first data representing user filter selections received via the first GUI; and determine an updated ranked list of the plurality of fashion item images of the second category by filtering out one or more fashion item images based on the user filter selections, wherein the second fashion item image is among the fashion item images of the updated ranked list.

19. A computer-implemented method comprising:

receiving, by a recurrent neural network, first training data comprising ground truth outfit data, the ground truth outfit data comprising first fashion item data and second fashion item data;

inputting a first visual feature vector representing the first fashion item data into the recurrent neural network;

generating, by the recurrent neural network using the first visual feature vector, a first predicted visual feature vector for the second fashion item data;

generating an updated recurrent neural network by decreasing a difference between the first predicted visual feature vector and a ground truth visual feature vector associated with the second fashion item data;

causing a first graphical user interface (GUI) to be displayed, the first GUI depicting at least a first fashion item image associated with a first category;

determining a first user profile;

determining first filter settings of the first user profile;

receiving a first selection of a first graphical control on the first GUI, the first selection corresponding to a request for a recommendation from a second category;

determining a second fashion item image from among a plurality of fashion [items] item images of the second category, wherein the second fashion item image is determined by the updated recurrent neural network using a combined input vector comprising a visual descriptor feature vector for the first fashion item image, a category vector for the second fashion item image, and an attribute vector for the second fashion item image, wherein the second fashion item image is selected in accordance with the first filter settings of the first user profile; and causing the second fashion item image to be displayed on the first GUI.

20. The computer-implemented method of claim 19, further comprising:

causing a second graphical control to be displayed on the first GUI in association with the first fashion item image, wherein selection of the second graphical control is effective to label a fashion item associated with the first fashion item image as being owned by a user associated with the first user profile; and storing first data in a data store, the first data indicating that the fashion item associated with the first fashion item image is owned by the user associated with the first user profile.

\* \* \* \* \*